United States Patent
Cascetta et al.

(10) Patent No.: US 12,469,254 B2
(45) Date of Patent: Nov. 11, 2025

(54) INTERPUPILLARY DISTANCE ESTIMATION METHOD

(71) Applicant: LUXOTTICA GROUP S.P.A., Milan (IT)

(72) Inventors: Cristian Cascetta, Milan (IT); Fabio Mazzarella, Busto Arsizio (IT); Luca Mazzocchi, Legnano (IT)

(73) Assignee: LUXOTTICA GROUP S.P.A., Milan (IT)

( * ) Notice: Subject to any disclaimer, the term of this patent is extended or adjusted under 35 U.S.C. 154(b) by 424 days.

(21) Appl. No.: 18/083,692

(22) Filed: Dec. 19, 2022

(65) Prior Publication Data
US 2023/0206598 A1 Jun. 29, 2023

(30) Foreign Application Priority Data
Dec. 27, 2021 (IT) .......................... 102021000032711

(51) Int. Cl.
G06V 10/74 (2022.01)
G06T 7/62 (2017.01)
G06V 40/18 (2022.01)

(52) U.S. Cl.
CPC .............. *G06V 10/761* (2022.01); *G06T 7/62* (2017.01); *G06V 40/193* (2022.01);
(Continued)

(58) Field of Classification Search
CPC .............. G06V 10/761; G06V 40/193; G06V 2201/07; G06T 7/62; G06T 7/60;
(Continued)

(56) References Cited

U.S. PATENT DOCUMENTS

| 11,798,189 B2 * | 10/2023 | Hoyle ........................ G06T 7/60 |
| 2010/0110374 A1 * | 5/2010 | Raguin ................ A61B 3/1216 |
| | | 382/117 |

(Continued)

FOREIGN PATENT DOCUMENTS

| CN | 108573204 A | * | 9/2018 | ........... G06V 40/197 |
| CN | 112257563 A | * | 1/2021 | ............. G06V 40/18 |
| JP | 2012239566 A | | 12/2012 | |

OTHER PUBLICATIONS

J. Driessen, H. Vuyk, J. Borgstein, New insights into facial anthropometry in digital photographs using iris dependent calibration, International Journal of Pediatric Otorhinolaryngology, vol. 75, Issue 4, 2011, pp. 579-584, ISSN 0165-5876, https://doi.org/10.1016/j.ijporl.2011.01. (Year: 2011).*

(Continued)

*Primary Examiner* — Chan S Park
*Assistant Examiner* — Paulo Andres Garcia
(74) *Attorney, Agent, or Firm* — CANTOR COLBURN LLP

(57) ABSTRACT

An interpupillary distance estimation method is implementable by an electronic computer and includes the operations of acquiring at least one 2D image of a user's face, locating on the 2D image two reference points corresponding to the pupils of the user, and measuring the distance in pixels between the two reference points. The method further includes measuring the diameter in pixels of the user's iris, and calculating the pixel-to-millimetre conversion ratio between a predetermined iris diameter expressed in metric units and the iris diameter measured in pixels. The predetermined pupil diameter is set equal to the value of the iris diameter most widespread in the world population according to data contained in an anthropometric database. A first estimation of the interpupillary distance is determined by multiplying the distance in pixels between the two reference (Continued)

points corresponding to the user's pupils by the pixel-to-millimetre ratio calculated previously.

9 Claims, 4 Drawing Sheets

(52) U.S. Cl.
CPC ............... *G06T 2207/20024* (2013.01); *G06T 2207/30201* (2013.01); *G06T 2207/30204* (2013.01); *G06V 2201/07* (2022.01)

(58) Field of Classification Search
CPC . G06T 2207/20024; G06T 2207/30201; G06T 2207/30204; G06T 2207/20084; G06T 2207/30041
See application file for complete search history.

(56) References Cited

U.S. PATENT DOCUMENTS

| | | | | |
|---|---|---|---|---|
| 2013/0076884 A1* | 3/2013 | Choukroun | ......... | H04N 23/611 348/78 |
| 2016/0063314 A1 | 3/2016 | Samet | | |
| 2016/0335495 A1* | 11/2016 | Kim | .................... | G06V 10/993 |
| 2017/0344110 A1* | 11/2017 | Yoshioka | ............. | G06V 40/193 |
| 2018/0018516 A1 | 1/2018 | Odinokikh et al. | | |
| 2018/0199810 A1* | 7/2018 | Li | .............................. | G06T 7/60 |
| 2019/0046029 A1 | 2/2019 | Tomasi et al. | | |

OTHER PUBLICATIONS

Machado CEP, Flores MRP, Lima LNC, Tinoco RLR, Franco A, Bezerra ACB, et al. (2017) A new approach for the analysis of facial growth and age estimation: Iris ratio. PLoS One 12(7): e0180330. https://doi.org/10.1371/journal.pone.0180330 (Year: 2017).*

S. Simmen, H. R. Briner, N. Jones, Objective Assessment of Tip Projection and the Nasolabial Angle in Rhinoplasty, AMA, Archives of Facial Plastic Surgery, vol. 6, is. 5, p. 296-298, doi: 10.1001/archfaci.6.5.295 (Year: 2004).*

Flores et al. (2019), Comparative Assessment of a Novel Photo-Anthropometric Landmark-Positioning Approach for the Analysis of Facial Structures on Two-Dimensional Images. J Forensic Sci, 64: 828-838. https://doi.org/10.1111/1556-4029.13935 (Year: 2018).*

Basbrain et al., "Shallow convolutional neural network for eyeglasses detection in facial images" 2017 9th Computer Science and Electronic Engineering (CEEC). IEEE, Sep. 2017 (pp. 157-161).

Search Report issued in Italian Application No. 102021000032711; Application Filing Date Dec. 27, 2021; Date of Report Aug. 17, 2022 (8 pages).

* cited by examiner

INTERPUPILLARY DISTANCE ESTIMATION METHOD

CROSS-REFERENCE TO RELATED APPLICATIONS

This application claims the benefit of Italian Application Serial No. 102021000032711 filed on Dec. 27, 2021, the disclosure of which is incorporated herein by reference in its entirety

BACKGROUND

The present invention refers to an interpupillary distance estimation method using terminals such as smartphones, laptops and so on.

The interpupillary distance or IPD is a fundamental quantity for the choice and configuration of glasses. Generally, when buying glasses at the shop, the optician draws two points on the test lenses at the estimated position of the pupils per eye; the distance between the two drawn points is considered the interpupillary distance of the user.

Recently, computer programs or software have been developed that can estimate the interpupillary distance of a user through the analysis of an acquired digital image of the user's face. This software is loaded on specific terminals installed in the shops.

In recent years, however, with the growth of e-commerce, i.e. the sale of online products on the internet network, it has become necessary to have software for estimating the interpupillary distance installed on mobile terminals or desktop personal computers (PCs) of the users and integrated into online sales software applications.

The presence of cameras integrated in mobile terminals or cameras connected to desktop PCs allows the immediate acquisition of the digital images that the software needs to estimate the interpupillary distance. Interpupillary distance estimation methods implemented through terminal software based on recognition of an object or sign with known dimensions in the digital image of the acquired user's face are known.

Such interpupillary distance estimation methods comprise the steps of:
  acquiring a two-dimensional (2D) image of the user's face in which a real object with known metric size and well-known visual appearance is positioned near the user's face; for example such real object can be a credit card for example positioned by the user on his forehead;
  detecting the real object on the 2D image using Computer Vision (CV) techniques;
  measuring the distance in pixels between two predetermined points of the real object whose distance in metric units is known, for example the distance between the two short sides of the credit card;
  calculating the pixel-to-millimetre conversion ratio between the known distance between the two predetermined points of the real object expressed in metric units and the distance measured in pixels;
  detecting on the 2D image two reference points corresponding to the pupils;
  measuring the distance in pixels between the two reference points;
  determining the estimation of the interpupillary distance expressed in metric units by multiplying the distance in pixels between the two reference points by the pixel-to-millimetre conversion ratio.

The interpupillary distance estimation method has the advantage of not requiring images acquired with complex photography systems comprising depth cameras in order to be implemented; this method, therefore, can be implemented by mobile terminals or desktop PCs provided with simple cameras.

The known interpupillary distance estimation method described above has some drawbacks.

One drawback is that it is rather uncomfortable for the user to take a photograph with a real object in close proximity to the face. The positioning of the real object must necessarily be such that the real object lies on a plane aligned with the plane of the eyes; such positioning is not easy to reach and varies from user to user.

Another drawback is that one has to be sure that the real object has well-known standard dimensions. To obviate this difficulty, as an alternative to the real object, one can think of representing a visual sign with known dimensions on a screen and of taking a photograph of the face together with this screen where the visual sign is represented. Of course, this methodology involves knowing the resolution and the scale factor of the screen; this is a complication since each screen has its own characteristics that influence the visual sign display.

The estimation of the interpupillary distance made by the known method described above has an accuracy that depends on the precision of the detection of the reference points and of the real object, on the sensitivity and resolution of the camera and on the ambient noise i.e. on the lighting or blurring conditions and on the user's pose.

SUMMARY

The object of the present disclosure is to overcome the aforementioned drawbacks and in particular to devise an interpupillary distance estimation method that is simpler than those based on the recognition of an object or sign with the dimensions known in the acquired digital image of the user's face.

This and other objects according to the present disclosure are achieved by realizing an interpupillary distance estimation method as set forth in claim 1.

A further object of the present disclosure is to obviate the aforementioned drawbacks and in particular to devise a computer program loadable into a memory of an electronic computer and comprising instructions leading the electronic computer to implement an interpupillary distance estimation method that is simpler than those based on the recognition of an object or sign with dimensions known in the acquired digital image of the user's face.

This further object according to the present disclosure is achieved by realizing a computer program.

Further features of the interpupillary distance estimation method are subject to the dependent claims.

BRIEF DESCRIPTION OF THE DRAWINGS

The features and advantages of an interpupillary distance estimation method according to the present disclosure will become more apparent from the following description, by way of example and not limitation, referring to the accompanying schematic drawings in which.

DETAILED DESCRIPTION

Figure 1:
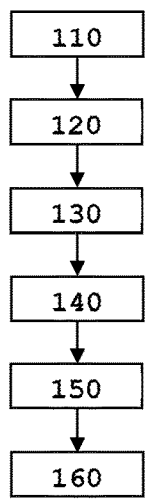
FIG. 1 is a flowchart depicting an interpupillary distance estimation method according to a first embodiment of the present disclosure.
Figure 2:
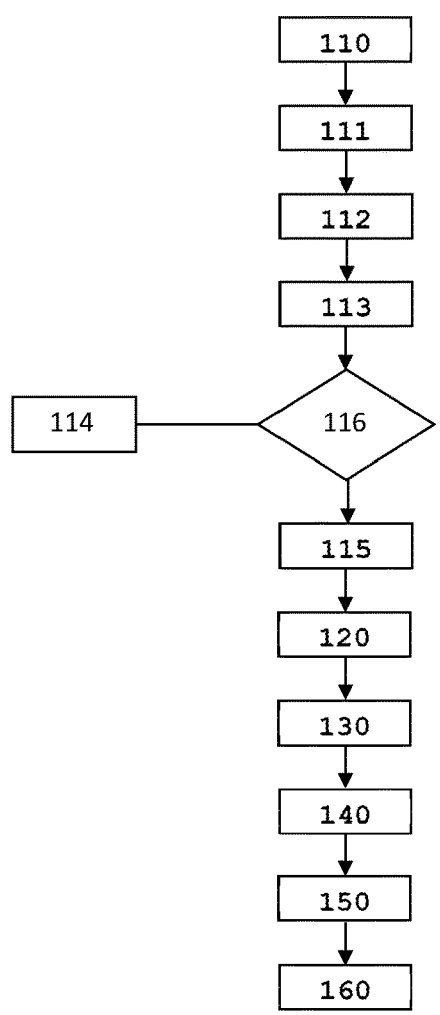
FIG. 2 is a flowchart depicting an interpupillary distance estimation method according to a second embodiment of the present invention.
Figure 3:
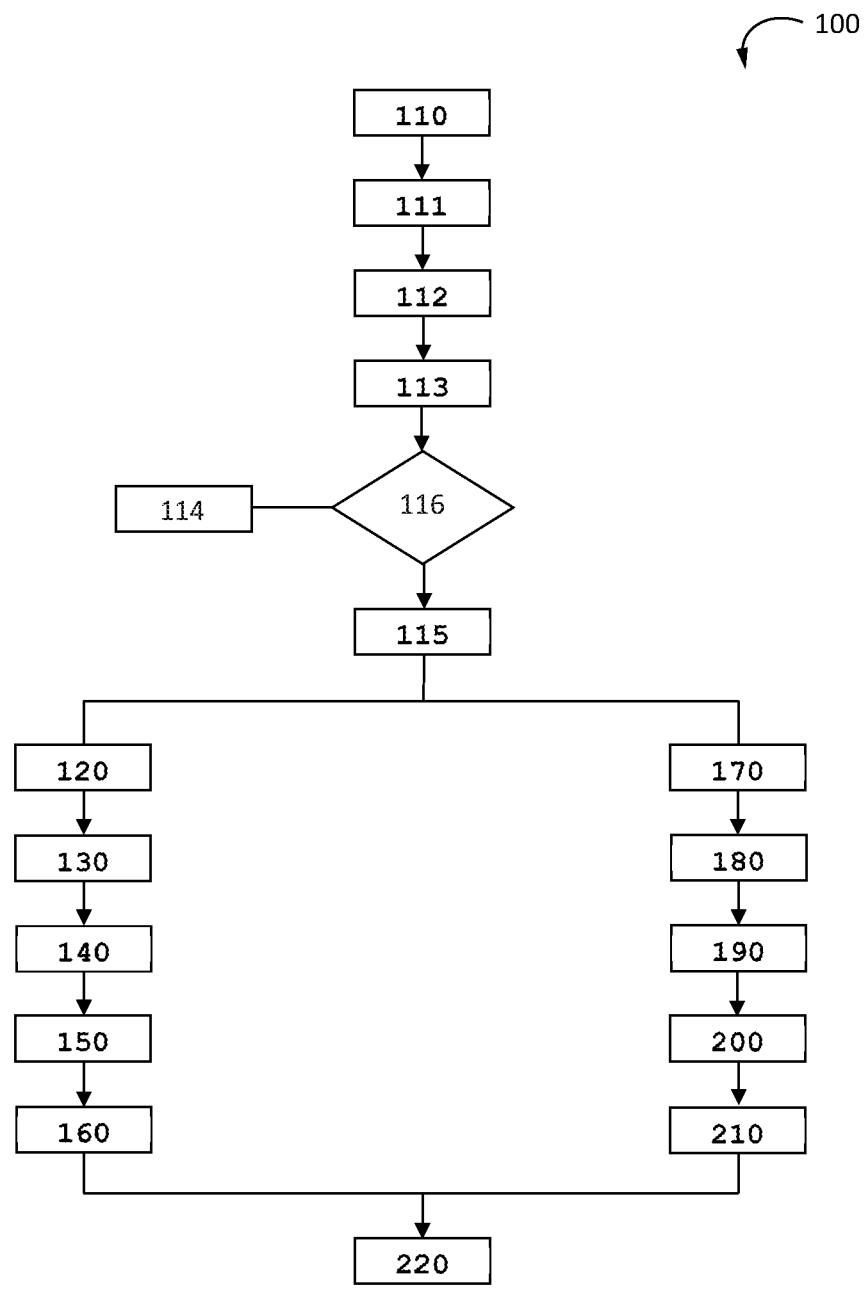
FIG. 3 is a flowchart depicting an interpupillary distance estimation method according to a third embodiment of the present invention.
Figure 4:
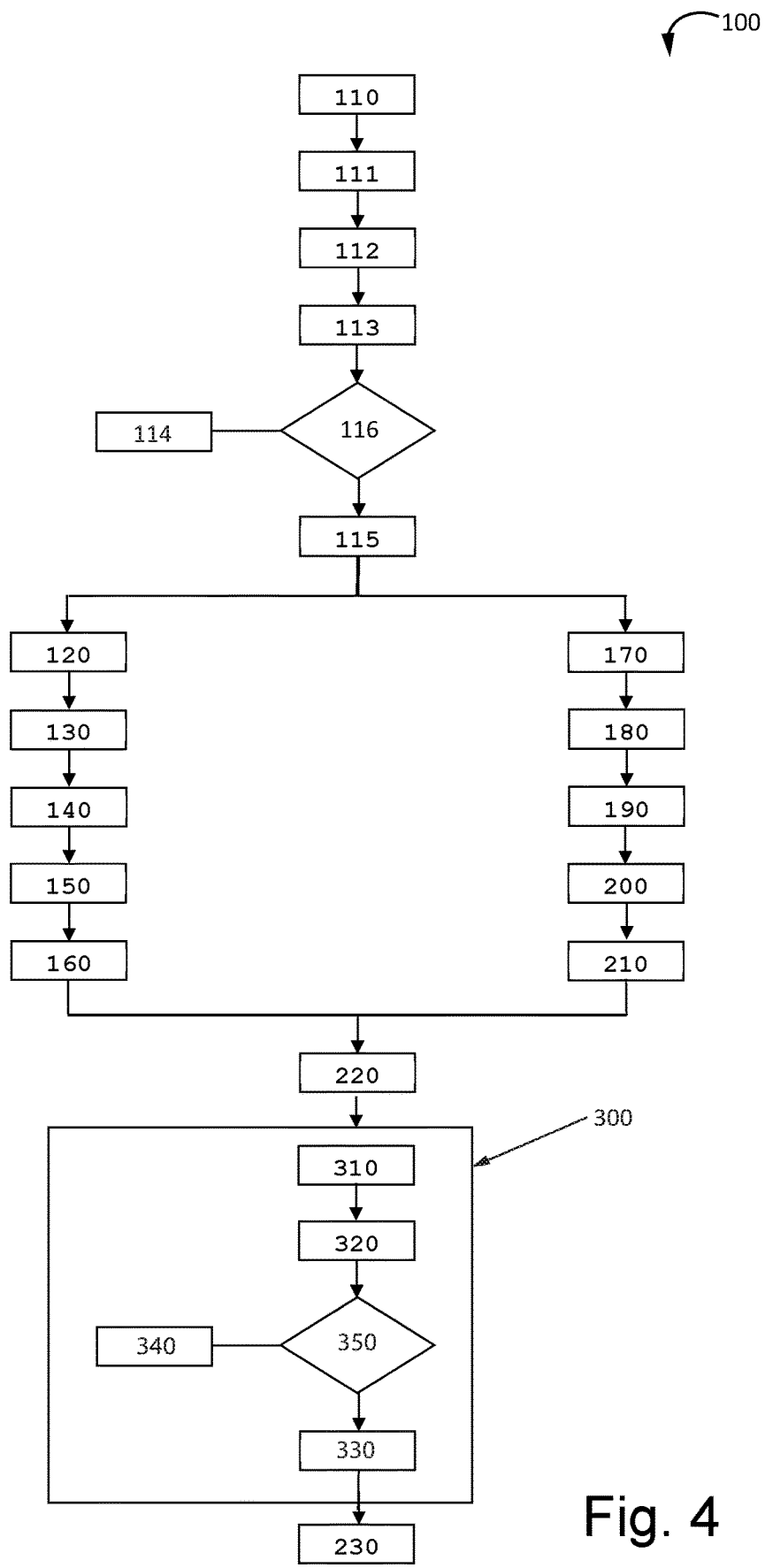
FIG. 4 is a flowchart depicting an interpupillary distance estimation method according to a fourth embodiment of the present invention.
Figure 5:
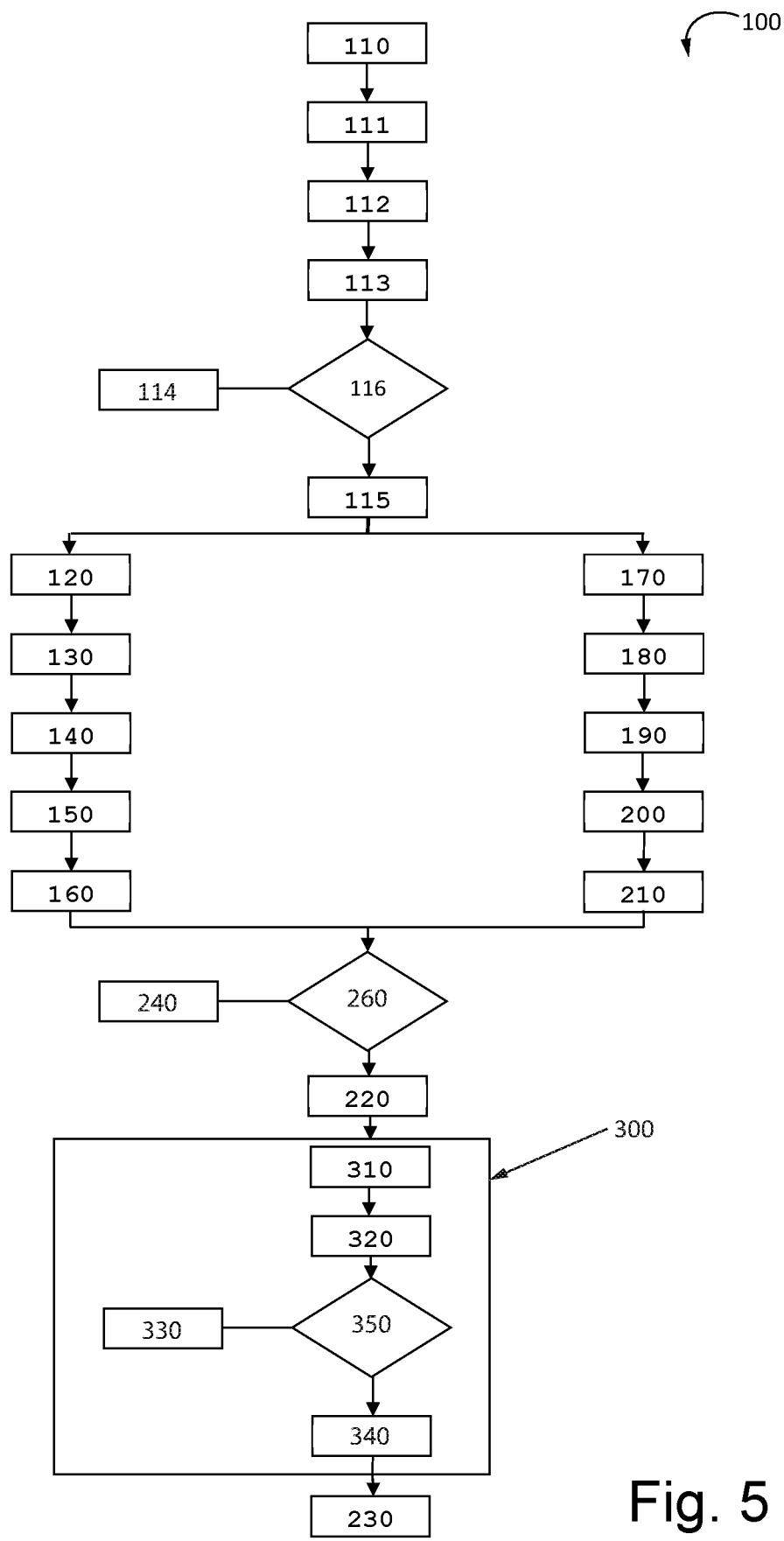
FIG. 5 is a flowchart depicting an interpupillary distance estimation method according to a fifth embodiment of the present invention.

With reference to the figures, an interpupillary distance estimation method is shown, indicated overall with 100.

Such an interpupillary distance estimation method 100 is implementable by an electronic computer provided with a memory for storing data. In particular, the interpupillary distance estimation method 100 is implementable by an interpupillary distance estimation program or software loaded into the computer memory. This interpupillary distance estimation program therefore comprises instructions leading the electronic computer to implement the interpupillary distance estimation method 100 when the electronic computer executes the program.

The interpupillary distance estimation program is associated with an e-commerce platform for glasses. The interpupillary distance estimation program is executed whenever a user makes a purchase of glasses on the e-commerce platform for glasses.

The interpupillary distance estimation method 100 according to the present invention comprises the steps of:
- acquiring 110 at least one two-dimensional 2D image of a user's face;
- locating 120 on the at least one 2D image acquired two reference points corresponding to the pupils;
- measuring 130 the distance in pixels between the two reference points corresponding to the pupils (IPDp);
- measuring 140 the diameter in pixels of the iris (DIp);
- calculating 150 the pixel-to-millimetre conversion ratio between a predetermined iris diameter expressed in metric units and the iris diameter measured in pixels;
- determining 160 a first estimation of the interpupillary distance expressed in metric units (IPD) by multiplying the distance in pixels between the two reference points corresponding to the pupils (IPDp) by the pixel-to-millimetre ratio calculated previously.

The step of acquiring 110 at least one 2D image is, in particular, performed by taking a photograph using a camera or a camera system of a mobile terminal or a desktop PC.

The step of locating 120 the reference points corresponding to the pupils and measuring 140 the iris diameter in pixels are performed by a first algorithm. For example, the first algorithm may be a digital image processing algorithm or a machine-learning algorithm that will not be described in detail as they are known in the state of the art.

For example, in the case in which the first algorithm is of the digital image processing type, it detects and locates the reference points corresponding to the pupils based on the detection of colours and geometric characteristics of the image. Conversely, in the case in which the first algorithm is of the machine-learning type, it detects and locates the reference points corresponding to the pupils based on a calculation model trained on a set of images in which the position of these points is already known.

Preferably, the predetermined iris diameter is set equal to the value of the iris diameter most widespread in the world population according to the data contained in an anthropometric database.

For example, the predefined iris diameter is 11.7±0.5 mm.

Preferably, the step of acquiring 110 at least one 2D image comprises a step of "pushing" the user towards optimal conditions for capturing the image or photograph.

This step of pushing the user comprises one or more of the following detections:
- detecting 111 the presence of glasses on the user's face;
- detecting 112 a plurality of photographic parameters necessary to infer the quality of the input image;
- detecting 113 a non-visible portion of the face, for example due to possible occlusions.

The photographic parameters are, for example, light exposure, focus, aperture, and so on. The uniformity of the face illumination is another very relevant qualitative component to ensure the quality of the input image. The detection of the photographic parameters takes place by a digital image processing algorithm in a way that is per se known.

In this case, the step of "pushing" the user towards conditions for taking in an optimal manner the visual data also comprises the steps:
- evaluating 116 the detections 111, 112, 113;
- notifying 114 the user to remove the glasses after the detection of the presence of glasses on the user's face and/or to modify the relative positioning between the camera and the face after the detection of at least one photographic parameter outside a respective range of acceptability threshold values or of a non-visible portion of the face;
- taking 115 the photograph if the presence of the glasses is not detected and no photographic parameter outside a respective range of acceptability threshold values and no non-visible portion of the face are detected.

Notification 114 to the user can take place in various ways, for example with a text message on the terminal screen or with a light indication of the traffic light type where red indicates a non-optimal acquisition condition and green indicates an optimal acquisition condition.

The detection of the presence of the glasses on the user's face 111 and detection of a non-visible portion are preferably performed by a second machine-learning algorithm.

Such a second machine-learning algorithm can preferably be based on a convolution neural network or CNN trained not only to detect the presence/non-presence of glasses and the presence/non-presence of non-visible portions of the face but also to detect the type of glasses or to distinguish between prescription glasses and sunglasses. The training of the second algorithm is performed with a set of images in which the presence/non-presence and the type of glasses as well as the presence/non-presence of non-visible portions of the face are already known.

Preferably, after the acquisition step 110, the interpupillary distance estimation method 100 comprises the steps:
- estimating 170 the gender and age of the user by analysing the at least 2D image acquired;
- locating 180 on the at least 2D image acquired two reference points corresponding to the cheekbones;
- measuring 190 the distance in pixels between the two reference points corresponding to the cheekbones (DZp);
- calculating 200 a first ratio of IPDp/DZp or a second ratio of (DZp-IPDp)/DZp;

determining 210 a second estimation of the interpupillary distance expressed in metric units (IPD) based on the first ratio or the second ratio and on the data relative to the user's gender and age;

determining 220 a third estimation of the interpupillary distance expressed in metric units (IPD) by combining the first estimation and the second estimation.

Preferably, the estimation 170 of the gender and age of the user is performed by a third algorithm of the machine-learning type, preferably based on convolutional neural networks; this third algorithm is trained with a set of images in which the gender and age of the represented individual are known.

Preferably, the localization 180 of the two reference points corresponding to the cheekbones is performed by a fourth machine-learning algorithm configured to detect relevant points of a person's face; this fourth algorithm is in particular trained with a set of images in which the position of the cheekbones is known.

Preferably, the step of determining 210 a second estimation of the interpupillary distance is performed by a fifth machine-learning algorithm. The fifth algorithm is trained on the set of data contained in the aforesaid anthropometric database in which the gender and age data are present in correlation with the aforesaid first IPDp/DZp ratio and the aforesaid second ratio (DZp-IPDp)/DZp, in which the value of the IPD is already known.

For example, the third estimation may be determined by calculating the arithmetic average between the first estimation and the second estimation.

Before the step of determining the third estimation 220, the interpupillary distance estimation method 100 comprises the steps of:

comparing 260 the difference between the first estimation and the second estimation with a predefined estimation reliability threshold value;

if the difference between the first estimation and the second estimation exceeds a predefined estimation reliability threshold value, notifying 240 the user to repeat the 2D image acquisition;

if the difference between the first estimation and the second estimation is lower than a predefined estimation reliability threshold value, proceeding to the step of determining the third estimation 220.

This reduces the uncertainty in the estimation of the interpupillary distance making the third estimation increasingly accurate.

Preferably, the acquisition step 110 provides for acquiring a plurality of 2D images.

In such a case, all steps of the interpupillary distance estimation method 100 are performed for all 2D images and the method 100 itself comprises the steps:

calculating 230 the average value of the first estimations or, in the case in which the determining of the third estimations is provided, calculating the average value of the third estimations.

Preferably, the interpupillary distance estimation method 100 comprises, before the average value calculation step 230, a filtering step 300 wherein for each 2D image acquired, the 2D image is evaluated as reliable or unreliable and the 2D image is discarded from the step of calculating the average value 230 if it is evaluated as unreliable.

More preferably, the filtering step 300 comprises for each acquired 2D image the steps:

locating 310 on the 2D image a plurality of marker points corresponding to specific features of a user's face comprising at least the eyelids; other features of the face may be for example nose, mouth, eyebrows and so on;

determining 320 a ratio representative of the degree of eyelid opening, where such ratio is called eye aspect ratio;

comparing 350 the eye aspect ratio with a predefined image acceptability threshold value;

if the eye aspect ratio is greater than said predefined image acceptability threshold value, considering the 2D image as acceptable 330;

if the eye aspect ratio is lower than the predefined image acceptability threshold value, considering the 2D image as unacceptable 340.

The localization 310 of the marker points is performed by the fourth machine-learning algorithm.

From the description made, the features of the interpupillary distance estimation method object of the present invention are clear, as are the relative advantages.

In fact, the method, according to the present invention, makes it possible to obtain an accurate estimation of the interpupillary distance based on a 2D image that can be acquired with any camera and without having to show in the image a real object with known standard dimensions. In fact, the estimation method uses information from anthropometric databases to calculate the pixel/millimetre conversion ratio.

This implies that the estimation method, according to the present invention, can be implemented in any terminal provided with at least one camera, therefore also mobile terminals such as smartphones with low-end hardware characteristics.

In the case in which the calculation of the average value and filtering step is envisaged, the estimation method is even more accurate.

The step of pushing the user towards optimal conditions for capturing the image or photograph ensures the acquisition of 2D images that are as suitable as possible to provide reliable estimations.

This step of pushing the user is performed automatically, simplifying the end-user experience, minimising the user effort and avoiding the need for any tool other than the terminal.

Finally, it is clear that the estimation system thus conceived is susceptible of numerous modifications and variations, all of which are within the scope of the invention; moreover, all the details can be replaced by technically equivalent elements. In practice, the materials used, as well as their dimensions, can be of any type according to the technical requirements.

The invention claimed is:

1. Interpupillary distance estimation method implementable by an electronic computer provided with a memory for storing data, said interpupillary distance estimation method comprising the steps of:

acquiring a plurality of two-dimensional (2D) images of a user's face;

locating on the at least one 2D image acquired two reference points corresponding to the pupils of the user;

measuring the distance in pixels between the two reference points corresponding to the user's pupils (IPDp);

measuring the diameter in pixels of the user's iris (DIp);

calculating the pixel-to-millimetre conversion ratio between a predetermined iris diameter expressed in metric units and the iris diameter measured in pixels, said predetermined iris diameter being set equal to the value of the iris diameter most widespread in the world population according to data contained in an anthropometric database;

determining a first estimation of the interpupillary distance expressed in metric units (IPD) by multiplying the distance in pixels between the two reference points corresponding to the user's pupils (IPDp) by the pixel-to-millimetre ratio calculated previously, wherein said interpupillary distance estimation method comprises the step of:

calculating an average value of the first estimations; and before calculating the average value of the first estimations, performing a filtering step wherein for each 2D image acquired, the 2D image is evaluated as reliable or unreliable and the 2D image is discarded from the step of calculating the average value when it is evaluated as unreliable, wherein the filtering step comprising for each 2D image acquired the steps of:

locating on the 2D image a plurality of marker points corresponding to specific features of the user's face comprising at least the eyelids;

determining a ratio representative of the degree of eyelid opening, where such ratio is called eye aspect ratio;

comparing the eye aspect ratio with a predefined image acceptability threshold value;

when the eye aspect ratio is greater than the image acceptability threshold value, considering the 2D image as acceptable;

when the eye aspect ratio is lower than the image acceptability threshold value, considering the 2D image as unacceptable.

2. The interpupillary distance estimation method according to claim 1 wherein the step of locating the reference points corresponding to the user's pupils, and measuring the iris diameter in pixels are performed by a first machine-learning algorithm or a first digital image processing algorithm.

3. The interpupillary distance estimation method according to claim 1 wherein the step of acquiring at least one 2D image comprises a step of pushing the user towards optimal conditions for capturing the image or photograph, said step of pushing the user comprising one or more of the following detections:

detecting the presence of glasses on the user's face;

detecting a plurality of photographic parameters necessary to infer the quality of the acquired image;

detecting a non-visible portion of the face, said step of pushing the user also comprising the steps of:

evaluating said detections;

notifying the user to remove the glasses after the detection of the presence of glasses on the user's face and/or to modify the relative positioning between the camera and the face after the detection of at least one photographic parameter outside a respective range of acceptability threshold values or of a non-visible portion of the face and repeating the detection steps;

taking the photograph when the presence of the glasses is not detected and no photographic parameter outside a respective range of acceptability threshold values and no non-visible portion of the face are detected.

4. The interpupillary distance estimation method according to claim 3 wherein the detection of the presence of glasses on the user's face and the detection of a non-visible portion are performed by a second algorithm trained with a set of images wherein the presence/non-presence of glasses, the type of glasses and the presence/non-presence of non-visible portions of the face are already known.

5. The interpupillary distance estimation method according to claim 1 comprising, after the acquisition step, the steps of:

estimating the gender and age of the user by analysing at least the 2D image acquired;

locating on the at least 2D image acquired two reference points corresponding to the cheekbones;

measuring the distance in pixels between the two reference points corresponding to the cheekbones (DZp);

calculating a first ratio of IPDp/DZp or a second ratio of (DZp-IPDp)/DZp;

determining a second estimation of the interpupillary distance expressed in metric units (IPD) based on the first ratio or the second ratio and on the data relative to the user's gender and age;

determining a third estimation of the interpupillary distance expressed in metric units (IPD) as an average of the first estimation and the second estimation.

6. The interpupillary distance estimation method according to claim 5 wherein:

said step of estimating the gender and age of the user is performed by a third machine-learning algorithm trained with a set of images in which the gender and age of the individual represented are known;

said step of detecting the two reference points corresponding to the cheekbones is performed by a fourth machine-learning algorithm trained with a set of images in which the position of the cheekbones is known;

said step of determining said second estimation is performed by a fifth machine-learning algorithm trained with a set of data contained in an anthropometric database in which gender and age data of an individual are present in correlation with said first IPDp/DZp ratio and said second (DZp-IPDp)/DZp ratio, in which the IPD value is already known.

7. The interpupillary distance estimation method according to claim 5 comprising the steps:

comparing the difference between the first estimation and the second estimation with a predefined estimation reliability threshold value;

when the difference between the first estimation and the second estimation exceeds the predefined estimation reliability threshold value, notifying the user to repeat the 2D image acquisition;

when the difference between the first estimation and the second estimation is lower than the predefined estimation reliability threshold value, proceeding to the step of determining the third estimation.

8. The interpupillary distance estimation method according to claim 6 wherein the localization of the marker points is performed by said fourth machine-learning algorithm.

9. A computer program product stored on a non-transitory memory of an electronic computer and comprising instructions leading the electronic computer to estimate an interpupillary distance, wherein the electronic computer executes the program to perform operations comprising:

acquiring a plurality of two-dimensional (2D) images of a user's face;

locating on the at least one 2D image acquired two reference points corresponding to the pupils of the user;

measuring the distance in pixels between the two reference points corresponding to the user's pupils (IPDp);

measuring the diameter in pixels of the user's iris (DIp);

calculating the pixel-to-millimetre conversion ratio between a predetermined iris diameter expressed in metric units and the iris diameter measured in pixels, said predetermined iris diameter being set equal to the value of the iris diameter most widespread in the world population according to data contained in an anthropometric database;

determining a first estimation of the interpupillary distance expressed in metric units (IPD) by multiplying the distance in pixels between the two reference points corresponding to the user's pupils (IPDp) by the pixel-to-millimetre ratio calculated previously, wherein said interpupillary distance estimation method comprises the step of:

calculating an average value of the first estimations; and before calculating the average value of the first estimations, performing a filtering step wherein for each 2D image acquired, the 2D image is evaluated as reliable or unreliable and the 2D image is discarded from the step of calculating the average value when it is evaluated as unreliable, wherein the filtering step comprising for each 2D image acquired the steps of:

locating on the 2D image a plurality of marker points corresponding to specific features of the user's face comprising at least the eyelids;

determining a ratio representative of the degree of eyelid opening, where such ratio is called eye aspect ratio;

comparing the eye aspect ratio with a predefined image acceptability threshold value;

when the eye aspect ratio is greater than the image acceptability threshold value, considering the 2D image as acceptable;

when the eye aspect ratio is lower than the image acceptability threshold value, considering the 2D image as unacceptable.

* * * * *